2,900,423
MANUFACTURE OF PERFLUOROPROPENE

Lee B. Smith, Woodbridge, N.J., assignor to Allied Chemical Corporation, a corporation of New York No Drawing. Application December 13, 1957
Serial No. 702,536

6 Claims. (Cl. 260—653.5)

This invention is directed to processes for making perfluoropropene, $CF_3CF=CF_2$, a known colorless liquid compound having a boiling point of minus 29° C.

It has been proposed to make perfluoropropene by zinc dechlorination of $CF_3CFClCF_2Cl$, and by pyrolysis of polymeric and monomeric olefinic materials. The former procedure is obviously uneconomic, and the later procedures involve the disadvantages of relatively high temperature reactions.

A major object of the present invention lies in the provision of processes for making perfluoropropene from monochloroperfluoropropane and hydrogen by an easily controllable, catalytic gas-phase combination dechlorination and defluorination reaction which may be carried out at ordinary pressure and at relatively low temperature.

Gas phase dehalogenation processes broadly are not new. It has been found that monochloroperfluoropropane, $CF_3CFClCF_3$, (B.P. minus 2° C.) a colorless liquid, is a readily available, notably suitable starting material for making perfluoropropene by dehalogenation provided a chlorine atom and a fluorine atom can be removed economically from adjacent carbon atoms. Prior art catalysts tend to remove or replace chlorine in preference to fluorine or vice versa. In accordance with the invention, it has been found that certain metallic copper-oxide of chromium-metallic nickel catalytic materials are highly selective and possess the property of effecting, under certain reaction conditions, simultaneous removal of equimolecular quantities of chlorine and fluorine from adjacent carbon atoms of $CF_3CFClCF_3$. Hence, the invention comprises selection of $CF_3CFClCF_3$ as organic starting material, the discovery of the indicated properties of the catalyst material, and the provision of certain reaction conditions, all of which factors conjunctively function to make possible manufacture of perfluoropropene by commercially practicable procedures.

I have found that perfluoropropene may be prepared advantageously, according to a process adapted for continuous operation, by reacting hydrogen with

in the vapor phase at relatively low temperatures while in the presence of a catalyst comprising metallic copper, an oxide of chromium, and metallic nickel. The major reaction of the invention process may be represented by

In carrying out the invention process, a vaporous mixture of hydrogen and $CF_3CFClCF_3$ is passed at a temperature substantially in the range of 375–475° C., through a reactor charged with a catalyst comprising metallic copper, an oxide of chromium and metallic nickel, for a period sufficient to bring about the dehalogenation reaction indicated. The reactor exit gases may be handled in any suitable way to recover perfluoropropene and separate the same from unreacted hydrogen and $$CF_3CFClCF_3$$

For example, reactor exit gases may be scrubbed to remove HF and HCl, dried and cooled, as in a Dry Ice cooled trap, to well below the minus 29° C. boiling point of $CF_3CF=CF_2$, in which case $CF_3CF=CF_2$ and the $CF_3CFClCF_3$ are condensed and separated from unreacted hydrogen. The propene may then be recovered by distillation.

The metallic copper-chromium oxide-metallic nickel catalyst employed may be prepared by coprecipitation of the hydroxides of the copper, chromium and nickel from a solution of the nitrates or chlorides by the addition of a solution of alkali metal hydroxide, filtering, washing and drying the filter cake. The dried cake may be granulated, pressed into pellets or used in other desirable physical form. Prior to use, the catalyst may be placed in the reactor and reduced in a stream of hydrogen while slowly raising the temperature up to say 350° C. To prevent excessive temperature rise due to heat of reduction, the hydrogen may be diluted with nitrogen. Copper compound is reduced to metallic copper, chromium takes the oxide form believed to be $Cr_2O_3$, and nickel compound is reduced to metallic nickel. Preferably, the catalyst is used on a suitable support. Calcium fluoride is preferred as the support, although other supports such as other alkaline earth fluorides, magnesium fluoride, or refractory oxides such as alumina may be used. The support may be coprecipitated along with the hydroxides of the active metals. For example, calcium fluoride may be coprecipitated with the active metal hydroxides by addition of alkali metal fluoride to an initial solution containing nitrate or chloride of calcium. Porous solid supports may be saturated with the nitrates of copper, chromium and nickel, dried and ignited, and the catalyst so prepared reduced with hydrogen in the reactor. Spent catalyst may be reconverted to the starting materials required for catalyst preparation by digestion of the spent catalyst with nitric acid.

Weight ratio of metallic copper to oxide of chromium to metallic nickel may vary considerably. Particularly outstanding results may be obtained using a catalyst comprising copper metal, an oxide of chromium and nickel metal supported on calcium fluoride, in which catalyst material the weight ratio of metallic copper to oxide of chromium to metallic nickel is about 1:1:2, and weight ratio of total active catalyst material to $CaF_2$ support is about 1.5:1. Metallic copper to chromium oxide to metallic nickel weight ratio may lie substantially in the range of 0.2:1:3 to 2:1:1; preferably about 1:1:2; and total catalyst material to support weight ratio may lie substantially in the range of 1:2 to 2:1, preferably 1.5:1.

The hydrogen and $CF_3CFClCF_3$ reactant may be mixed in any desired proportions. Hydrogen should be present in amount at least sufficient to react with a substantial amount of the starting material to form a substantial amount of the perfluoropropene. An excess of hydrogen or equimolecular proportions may be employed. Ordinarily, the quantity of hydrogen lies in the range of 0.75–1.25 mols per mol of $CF_3CFClCF_3$. In large scale work, it is advantageous and preferable to adjust ratios of reactants, reaction temperatures and residence time so that hydrogen is substantially completely reacted, and hence it is preferred to utilize a little less than equivalent proportions of hydrogen even if recycling of larger amounts of $CF_3CFClCF_3$ becomes necessary.

The temperatures at which the reaction may be carried out lie substantially in the range of 375–475° C., and preferably in the range of about 400–450° C. Pressures may be normal or superatmospheric. At temperatures lower than about 375° C. little or no reaction is obtained, whereas at temperatures above about 475° C. no advantages accrue, and the copper containing catalyst may be deleteriously affected. Contact time may vary considerably over the range of say 2–15 seconds, and contact times of 2.5–3 seconds have been found to be particularly desirable. Reaction rate at the temperatures specified is usually quite rapid, so that the contact time is not particularly critical and, depending upon particular operating conditions at hand, may be determined by test run.

Products exiting the reaction zone consist of the sought-for product $CF_3CF=CF_2$ together with any unreacted $CF_3CFClCF_3$ and possibly some hydrogen. The reactor exit may be water-scrubbed to remove HCl and HF, passed thru a 20% NaOH solution to remove traces of residual acid, and dried as by $CaCl_2$. The organic portions of the reactor exit may be isolated by suitable cooling, such as in a Dry Ice acetone trap. By this procedure, unreacted hydrogen passes thru the trap while $CF_3CF=CF_2$ and unreacted $CF_3CFClCF_3$ are obtained as condensate in the trap. The $CF_3CF=CF_2$ product may be recovered from the condensate by fractional distillation.

Following are examples of practice of the invention, parts and percentages being by weight unless otherwise indicated.

Example 1.—A copper metal-chromium oxide-nickel metal catalyst supported on calcium fluoride was prepared as follows. 121 g. of $Ca(NO_3)_2.4H_2O$, 149 g. of $$Ni(NO_3)_2.6H_2O$$

57 g. of $Cu(NO_3)_2.3H_2O$, and 79 g. of $Cr(NO_3)_3.9H_2O$ were dissolved in 1400 ml. of water. To this solution was added, while stirirng, 76 g. of KF and 123 g. of KOH dissolved in 800 ml. of water. The mixture was heated to boiling and filtered, and the resulting filter cake was washed and then dried at 120° C. The dried material was crushed to about 6–14 mesh, and about 45 ml. of the material were charged into a ½" I.D. tubular nickel reactor externally heated over about 20 inches of length by an electric furnace provided with automatic temperature control, the material being disposed in a central 9 inch long length of the reactor. The material was thoroughly dried and reduced by heating, during a period of about 5 hours, at temperature gradually increasing up to about 350° C., while in the presence of a stream of hydrogen. The finished catalyst contained about 3 parts of copper metal, 3 parts chromium oxide, 6 parts nickel metal, dispersed throughout 8 parts calcium fluoride.

Internal temperature of the reactor was raised to about 425° C., and a mixture consisting of about 331 g. (1.62 mols) of vaporized $CF_3CFClCF_3$ (B.P. minus 2° C.) organic starting material and about 1.5 mols (36 liters) of hydrogen was passed into and thru the reactor at a substantially constant rate during a period of about 3 hours. Contact time was about 2.5 seconds. Exit products of the reactor were passed thru water to remove most of the HCl and HF, thru an aqueous 20% NaOH solution to remove traces of residual acid, and then thru a $CaCl_2$ drying tower, and finally into an acetone Dry-Ice cooled trap, in which the organics were liquefied and collected, unreacted hydrogen exiting the cold trap. Fractional distillation of the cold trap liquid effected recovery of 129 g. (0.857 mol) of sought-for perfluoropropene product, $CF_3CF=CF_2$ (B.P. minus 29° C.), and 144 g. (0.709 mol) of monochloroperfluoropropane, $CF_3CFClCF_3$ starting material. Conversion of starting material was about 53%, and yield, on the basis of organic starting material converted, was about 94%.

Example 2.—In this run, the reactor, catalyst, temperature, contact time and other operating conditions, except as follows, were the same as in Example 1. During a period of about 3 hours, a vaporous mixture of $$CF_3CFClCF_3$$

and hydrogen consisting of about 324 g. (1.58 mols) of $CF_3CFClCF_3$ and about 1.5 mols (36 liters) of hydrogen was passed at about constant rate into and thru the reactor. The reactor exit was handled as in Example 1, and on fractional distillation of the cold trap liquid about 130 g. (0.843 mol) of perfluoropropene, and about 144 g. (0.709 mol) of unreacted monochloroperfluoropropane were recovered. Conversion of starting material was about 53.5%, and yield of perfluoropropene on the basis of the starting material converted was about 96.5%.

As known in the art, $CF_3CF=CF_2$ is useful for copolymerization with vinylidene fluoride to form high temperature resistant synthetic rubbers.

I claim:
1. The process for making $CF_3CF=CF_2$ which comprises subjecting $CF_3CFClCF_3$ in a reaction zone to the action of hydrogen in quantity sufficient to react with a substantial amount of said $CF_3CFClCF_3$, while maintaining temperatures substantially in the range of 375–475° C. and while in the presence of a metallic copper-oxide of chromium-metallic nickel catalyst, and recovering $CF_3CF=CF_2$ from the resulting reaction product.

2. The process of claim 1 in which temperature is maintained substantially in the range of 400–450° C.

3. The process of claim 1 in which the weight ratio of metallic copper to oxide of chromium to metallic nickel in the catalyst is substantially in the range of 0.2:1:3 to 2:1:1.

4. The process of claim 1 in which the quantity of hydrogen lies substantially in the range of 0.75–1.25 mols of hydrogen per mol of $CF_3CFClCF_3$.

5. The process for making $CF_3CF=CF_2$ which comprises subjecting $CF_3CFClCF_3$ in a reaction zone to the action of hydrogen in quantity lying substantially in the range of 0.75–1.25 mols of hydrogen per mol of $CF_3CFClCF_3$, while maintaining temperatures substantially in the range of 400–450° C. and while in the presence of a supported metallic copper-oxide of chromium-metallic nickel catalyst in which catalyst material the weight ratio of metallic copper to oxide of chromium to metallic nickel is substantially in the range of 0.2:1:3 to 2:1:1, and recovering $CF_3CF=CF_2$ from the resulting reaction product.

6. The process of claim 5 in which the support is calcium fluoride and the weight ratio of total catalyst to support lies substantially in the range of 1:2 to 2:1.

References Cited in the file of this patent
UNITED STATES PATENTS
2,685,606     Clark _____ Aug. 3, 1954